(12) United States Patent
Dodhia et al.

(10) Patent No.: US 12,186,824 B2
(45) Date of Patent: Jan. 7, 2025

(54) PROJECTION WELDING ELECTRODE HOLDER WITH ADJUSTABLE INSTANTANEOUS EXTENSION STROKE

(71) Applicant: TUFFALOY PRODUCTS, INC., Greer, SC (US)

(72) Inventors: Priyesh Dodhia, Greer, SC (US); Mitchell Albert Radford, Simpsonville (SC)

(73) Assignee: TUFFALOY PRODUCTS, INC., Greer, SC (US)

( * ) Notice: Subject to any disclaimer, the term of this patent is extended or adjusted under 35 U.S.C. 154(b) by 454 days.

(21) Appl. No.: 17/620,895

(22) PCT Filed: Jun. 23, 2020

(86) PCT No.: PCT/US2020/039113
§ 371 (c)(1),
(2) Date: Dec. 20, 2021

(87) PCT Pub. No.: WO2020/263813
PCT Pub. Date: Dec. 30, 2020

(65) Prior Publication Data
US 2022/0314360 A1    Oct. 6, 2022

Related U.S. Application Data

(60) Provisional application No. 62/865,479, filed on Jun. 24, 2019.

(51) Int. Cl.
*B23K 11/31* (2006.01)
*B23K 11/14* (2006.01)

(52) U.S. Cl.
CPC ............ *B23K 11/318* (2013.01); *B23K 11/14* (2013.01)

(58) Field of Classification Search
None
See application file for complete search history.

(56) References Cited

U.S. PATENT DOCUMENTS 2,068,043 A    1/1937    Warnke
2,938,996 A *  5/1960    Carswell ................ B23K 11/31
                                                              92/111

(Continued)

OTHER PUBLICATIONS

PCT/US International Search Report Re PCT;US2020/039113, Mailed Sep. 11, 2020.

*Primary Examiner* — Elizabeth M Kerr
(74) *Attorney, Agent, or Firm* — Timothy D. St. Clair; Parker Poe Adams & Bernstein, LLP

(57) ABSTRACT

A projection welding electrode holder has a holder body, a holder barrel, and a coned-disc spring. The holder body is configured for attachment to a welding machine and defines a holder body bore. The holder barrel is carried within the holder body bore and has a holder head that extends therefrom for attachment to a welding electrode. The holder barrel is movable relative to the holder body between a first position, in which the holder head extends from the holder body bore a first distance, and a second position, in which the holder head extends from the holder body bore a second distance, the first distance being greater than the second distance. The coned-disc spring resides within the holder body bore, biases the holder barrel toward the first position, and is compressed by movement of the holder barrel from the first position to the second position.

20 Claims, 7 Drawing Sheets

(56) References Cited

U.S. PATENT DOCUMENTS

| | | | |
|---|---|---|---|
| 2,985,140 A | | 5/1961 | Fagge |
| 3,632,958 A | * | 1/1972 | Width .................... B23K 11/31 219/119 |
| 4,762,976 A | | 8/1988 | Miller |

* cited by examiner

PROJECTION WELDING ELECTRODE HOLDER WITH ADJUSTABLE INSTANTANEOUS EXTENSION STROKE

CROSS REFERENCE TO RELATED APPLICATIONS

This application claims the benefit of priority of U.S. Provisional Application Ser. No. 62/865,479, filed on Jun. 24, 2019, which is incorporated herein in its entirety.

TECHNOLOGICAL FIELD

The present invention relates to a projection welding electrode holder and, more particularly, to a resistance projection welding electrode holder providing instantaneous movement of the electrode during the extension stroke and adjustability of the extension stroke force and length.

DESCRIPTION OF THE RELATED ART

Projection welding is a resistance welding process that uses a welding device having an upper electrode and a lower electrode. The upper electrode presses against an upper panel of work at the location corresponding to a protrusion portion extending from a lower panel of work toward the upper panel. The lower electrode is opposite the lower panel of work from the upper electrode. When electrical current is passed from one electrode to the other, there is a sudden rise in the temperature of the protrusion metal due to the contact resistance at the faying surface between the upper panel of work and lower panel of work to the point that the protrusion becomes plastic. As the protrusion heats and becomes plastic, it collapses, and the two metal pieces are forced together, and thereby welded together, at that location into what is referred to as a weld nugget.

For high quality welds, the welding apparatus must maintain constant pressure on the weld as the welding heat softens the metal protrusion. Thus, as the protrusion collapses, one of the electrodes ought to move with it and continue to apply pressure. Such movement of the electrode is referred to as an extension stroke. This softening of the work metal at the protrusion occurs abruptly. A typical cycle time for such an apparatus, including the extension stroke, is one sixtieth of a second (0.01667 second). Because of the very short time interval involved in such an operation, it is essential that the electrode extension stroke be rapid.

Reduction in pressure from the electrode during the extension stroke may cause undesirable arcing at the proposed weldment site, "blow out" of molten metal from that location, and/or less than complete interfusion of the two pieces being joined. Unfortunately, providing a protrusion welding electrode holder that has a sufficiently quick and forceful extension stroke has been difficult.

Prior devices have attempted to address these issues. U.S. Pat. Nos. 2,492,551; 2,810,062; 2,883,516; 2,938,996; 2,975,264; 3,632,958; 4,140,891; 6,603,228; and 9,802,268 provide examples of such prior devices. However, the devices disclosed by these patents, as well as other prior art devices not patented, suffer from one or more of the following shortcomings:

a. the moving components having a relatively large mass, with a corresponding increased moment of inertia, thereby increasing the acceleration time of the electrode which slows the extension stroke as the projection collapses;

b. more moving components, which cause more frictional resistance to movement, thereby increasing the acceleration time of the electrode which slows the extension stroke as the projection collapses and/or dampening the extension stroke;

c. allowing for no adjustment, or only cumbersome adjustment, of the electrode compressive force as may be required for different welding applications;

d. use of coil springs, which require a relatively longer extension stroke for the same amount of force, which correspondingly increases the duration of the extension stroke;

e. limited latitude, or no latitude at all, in the type of welder on which the electrode holder can be used, such as a press welder, a rocker arm welder, or a multi-spot welding;

f. limited latitude, or no latitude at all, as to the type of actuation, such as electro-mechanical servo, pneumatic, and hydraulic;

g. coolant provided to the inside the device, leading to spring corrosion, O-ring failure, and/or coolant leakage;

h. not adaptable to today's market demands for higher welding currents and higher welding compression forces; and i. the foregoing, alone or in combination, leading to a shorter service life.

The present invention relates to an improvement upon the known systems and methods for a projection welding electrode holder and provides distinct advantages over the conventional systems and methods.

BRIEF SUMMARY OF THE INVENTION

In response to the discussed difficulties and problems encountered before, a new projection welding electrode holder having excellent operability has been discovered.

In accordance with certain aspects of certain embodiments of the present technology, a projection welding electrode holder is provided, which includes a holder body configured for static attachment to a welding machine, a holder barrel, and a first coned-disc spring. The holder body may define therein a holder body bore. The holder barrel may be carried within the holder body bore and may include a holder head, the holder head extending from the holder body bore and configured for attachment to a welding electrode. The holder barrel may be movable relative to the holder body between a first position, in which the holder head extends from the holder body bore a first distance, and a second position, in which the holder head extends from the holder body bore a second distance, the first distance being greater than the second distance. The first coned-disc spring may reside within the holder body bore, bias the holder barrel toward the first position, and be compressed by movement of the holder barrel from the first position to the second position. In particular embodiments, the holder barrel may be integral. In certain configurations, the holder body and the holder barrel may be electrically conductive. The holder body may be closed to the receipt of flowing coolant in some examples. Individual forms of the technology may include a second coned-disc spring, stacked in parallel with the first coned-disc spring. With selective illustrations, a second coned-disc spring may be stacked in series with the first coned-disc spring.

In accordance with additional aspects of other embodiments of the present technology, a projection welding electrode holder comprises a holder body configured for static attachment to a welding machine, the holder body having an opening at one end and defining an internal cavity within the opening. The cavity may be free of flowing coolant. A holder barrel is also included, the holder barrel having a holder head configured to carry a welding electrode, a holder axle extending opposite the holder head, and a holder slider disposed between the holder head and the holder axle. The holder axle and the holder slider may reside within the internal cavity and the holder head may extend from the holder body. The holder head, the holder axle, and the holder slider may be integral, or electrically conductive, or both. The holder barrel may be movable relative to the holder body and relative to the welding machine, between a first position and a second position. In the first position, the holder head extends from the holder body a first distance and, in the second position, the holder head extends from the holder body a second distance, the first distance being greater than the second distance. A first Belleville washer may also be included. The first Belleville washer may be annular and may define a central channel. The first Belleville washer may reside within the cavity and opposite the slider from the holder head, with the holder axle disposed within the central channel. The first Belleville washer may bias the holder barrel toward the first position and be compressed by movement of the holder barrel from the first position to the second position. Specific representations may include a removable cover over the opening, the cover defining therethrough an aperture through which the holder head is disposed. In particular configurations, a second Belleville washer may be included, the first and second Belleville washer being stacked in one of parallel and series. Certain examples may include an electrically conductive first split contact residing between the holder slider and the first Belleville washer. Other forms may include an electrically conductive second split contact residing opposite the first Belleville washer from the holder slider. With selective representations of the present technology, the first Belleville washer may be replaceable by removing the holder barrel from the holder body, removing the first Belleville washer, and replacing the first Belleville washer with a second Belleville washer. A method of projection welding is also disclosed, comprising the steps of providing the projection welding electrode holder aforedescribed, attaching an electrode to the holder head, providing a welding work that includes projection, contacting the electrode against the welding work at the projection and increasing compressive force between the electrode and the projection until the holder barrel moves toward the second position, applying electric current through the electrode until the projection collapses, and maintaining force from the electrode to the welding work during such projection collapse by the holder barrel moving toward the first position resulting from at least partial decompression of the first Belleville washer. The electrode may then be removed from the welding work.

In accordance with yet additional aspects of other embodiments of the present technology, a projection welding electrode holder may comprise a holder body, a holder body cover, a holder barrel, and a first Belleville washer. The holder body may be configured for static attachment to a welding machine, be electrically conductive, have a first end and an opposed second end, and define a cylindrical cavity with a first diameter. The cavity may be open at the first end of the holder body and walled at the second end, and be devoid of flowing coolant. The holder body cover may be removably attached to the first end of the holder body and have an opening therethrough. The holder barrel may have a holder head configured to carry a welding electrode, a holder axle extending opposite the holder head, and a holder slider disposed between the holder head and the holder axle. The holder axle and the holder slider may reside within the internal cavity. The holder head may extend from the holder body through the opening of the cover. The holder slider may have a second diameter sized to complement the first diameter. The holder head, the holder axle, and the holder slider may be integral and electrically conductive. The holder barrel may be movable relative to the holder body and relative to the welding machine between a first position and an opposite second position, in which the holder head extends from the holder body a first distance when the holder barrel is at the first position and the holder head extends from the holder body a second distance when the holder barrel is at the second position, the first distance being greater than the second distance. The holder head may include a coolant channel isolated from the holder body cavity. The first Belleville washer may be an annular open ring and reside within the cavity and opposite the slider from the holder head. The holder axle may be disposed within the open ring. The first Belleville washer may bias the holder barrel toward the first position and be compressed by movement of the holder barrel from the first position to the second position. The holder body and the holder barrel may be fabricated of copper in particular embodiments. Certain examples provide the holder being configured for static attachment to any one of a press welder, a rocker arm welder, and a multi-sport welder. The holder may be configured for use with a welder of any one of pneumatic, hydraulic, and electromechanical actuation welders. The first Belleville washer may be replaceable by removing the cover, removing the holder barrel from the holder body, removing the first Belleville washer, and replacing the first Belleville washer with a second Belleville washer. The welding force of the electrode holder as aforedescribed may be increased by removing the cover, removing the holder barrel from the holder body, adding a second Belleville washer in parallel with the first Belleville washer, replacing the holder barrel in the holder body, and reattaching the cover. The length of the extension stroke of the electrode holder aforedescribed may be increased by removing the cover, removing the holder barrel from the holder body, adding a second Belleville washer in series with the first Belleville washer, replacing the holder barrel in the holder body, and reattaching the cover.

The foregoing description sets forth broadly certain features of the present invention so that the detailed description herein below may be better understood, and so that the present contributions to the art from this invention may be better appreciated.

Other advantages of the present invention will become apparent from the following descriptions, taken in connection with the accompanying drawings, wherein, by way of illustration and example, an embodiment of the present invention is disclosed.

BRIEF DESCRIPTION OF THE SEVERAL
VIEWS OF THE DRAWINGS

The details of the present invention, both as to its structure and operation, can be understood in reference to the detailed description below in combination with the drawings, in which.

Figure 1:
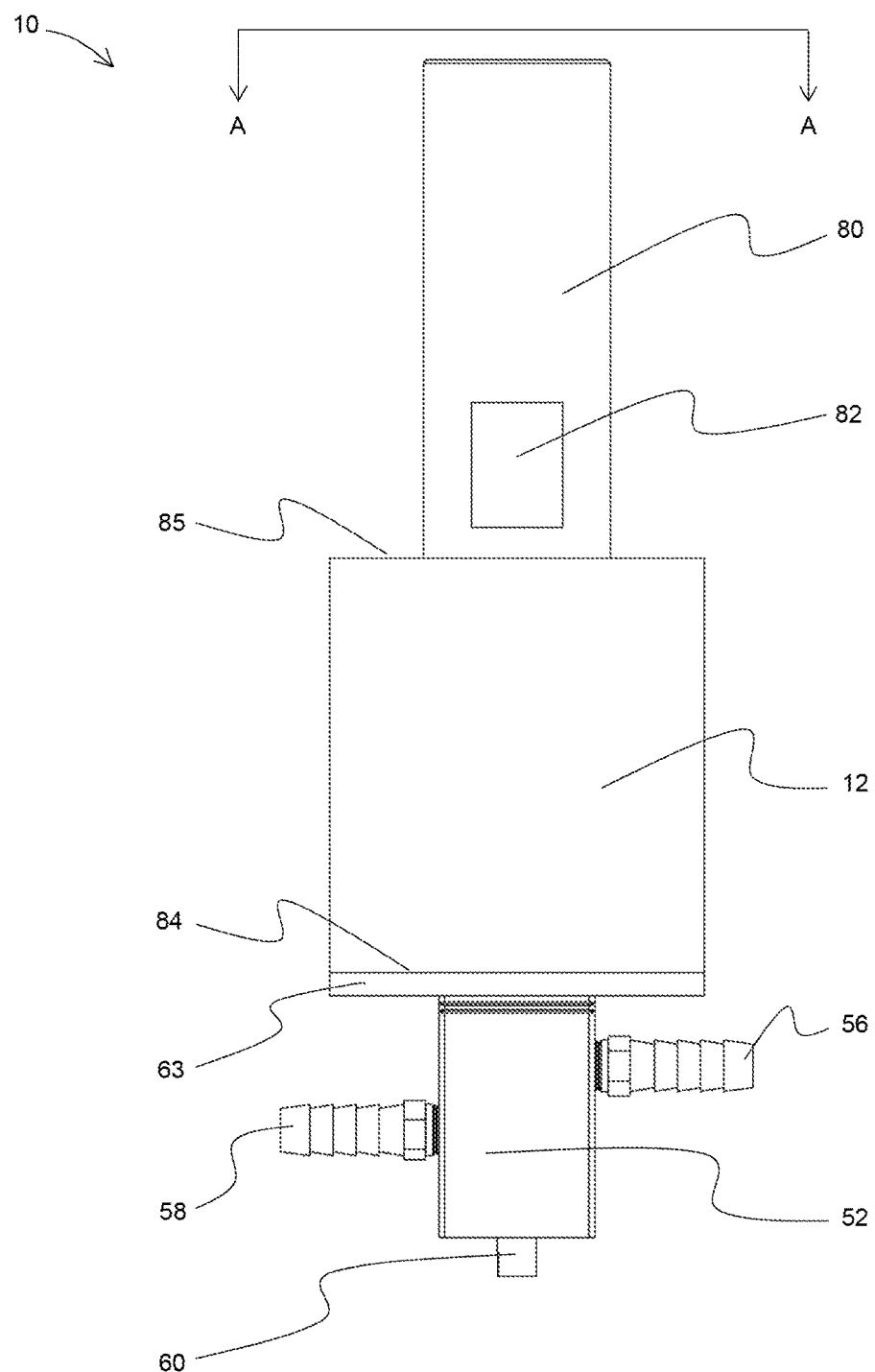
FIG. 1 is an elevation view of a projection welding electrode holder in accordance with an embodiment of the present invention.

It should be noted that the drawings discussed above and below are not to scale in all instances, but may have exaggerated dimensions in some respects to illustrate one or more of the principles of the invention.

DETAILED DESCRIPTION OF THE INVENTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. The embodiments of the present invention described below are not exhaustive nor do they limit the invention to the precise forms disclosed. Rather, the described embodiments are chosen so that others skilled in the art to which this invention pertains may appreciate and understand the principles and practice of the present invention.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the term "mounted" variations thereof is used broadly and encompasses direct and indirect mountings.

As used herein, the term "upper," "above," and like gravitational terms refer to a direction relatively closer to the welding machine to which the projection welding electrode holder is attached. The term "lower," "below," and the like refer to the direction opposite "upper," the direction relatively farther from the welding machine to which the projection welding electrode holder is attached.

An example of an earlier projection welding electrode holder is disclosed in U.S. Pat. No. 3,632,958, the full disclosure of which is incorporated herein by reference.

An electrode holder, generally 10, is provided. The electrode holder may include a holder body 12, a holder barrel 50, and one or more springs 36.

Holder body 12 may have a lower first end 84 and an opposed upper second end 85. Holder body 12 may define a cavity therein, the cavity, generally 13, being opened at lower first end 84 and being walled proximate to upper second end 85. Cavity 13, as exemplified herein as a cylindrical holder body bore 13, may define a first diameter and some embodiments. Other shapes of cavity 13, other than cylindrical, may also be used.

In certain applications, holder barrel 50 may be integral.

Holder body cavity 13 may include an upper terminus 14. In the illustrated embodiment, upper terminus 14 defines a negative frusto-conical concavity.

Holder body 12 may be configured for static attachment relative to a welding machine. In such a configuration, holder body 12 may be mounted to a welding machine and, during operation of such machine using electrode holder 10, holder body 12 would not move relative to such welding machine.

In some embodiments of holder body 12, one or more tapped holes 19 may be provided for use in attaching holder body 12 to a welding machine. In other embodiments, a shank 80 may be included, for use in attaching holder body 12 to a welding machine. Shank 80 may include a threaded end 81, for screwing into holder body 12. A wrench flat 82 may be included along shank 80 for receipt of a wrench jaw to use in fixing shank 80 to a holder body 12 by use of a wrench. Holder body 12 may include a shank bore 15 configured for receipt of the threaded end 81 of shank 80. Shank bore 15, in such a configuration, may include shank bore threads 16.

In certain applications, a set screw hole 17 may be included in holder body 12, by which a set screw (not shown) may tighten against a threaded end 81 of a shank 80 mounted in a shank bore 15 of a holder body 12, further fixing shank 80 to holder body 12.

By use of a shank 80 with a holder body 12, and or by use of a tapped hole 19 with a holder body 12, and/or by use of other mechanical attachments, holder body 12 may be configured for static attachment to any one of different types of welders, for examples press welders, rocker arm welders, and multi-spot welders. Similarly, electrode holder 10, with holder body 12, may be configured for use with a pneumatic welders, hydraulic welders, and electromechanical actuation welders.

Holder body 12 may be electrically conductive. In some examples of electrode holder 10, holder body 12 may be fabricated, in whole or in part, of copper.

Holder barrel 50 may be carried within holder body bore 13. Holder barrel 50 may include a holder head 52, the lower end 87 of holder head 52 configured to carry a welding electrode. Holder head 52 may extend from holder body bore 13.

Holder barrel 50 may also include a holder slider 53. Holder slider 53 resides above holder head 52 of holder barrel 50. Holder slider 53 may define a second diameter sized to complement the first diameter of holder body bore 13. Holder sider 53 may include an upper shoulder 54 and a lower shoulder 55. In particular embodiments, upper shoulder 54 may be frusto-conical in shape, whereas lower shoulder 55 may be planar.

Holder barrel 50 may also include a holder axle 51. Holder axle 51 may extend opposite holder slider 53 from holder head 52. Holder axle 51 and holder slider 52 may reside within the internal cavity 13 of holder body 12.

In certain embodiments, holder head 52, holder axle 51, and holder slider 53 may all be electrically conductive. In individual examples of electrode holder 10, holder head 52, holder axle 51, and holder slider 53 may each be fabricated of copper. In individual illustrations of electrode holder 10, holder head 52, holder axle 51, and holder slider 53 may be integral.

In particular examples of electrode holder 10, a cover, such as a clamp 63, may be provided to close the lower opening of holder bore 13. Clamp 63 may define therethrough an aperture through which holder head 52 may be disposed. Clamp 63 may be removably attached to the lower first end 84 of holder body 12 by use of clamp bolts 65*a-d*. Bolts 65*a-d* may be configured with bolt holes 18*a-d*, defined in lower first end 84 of holder body 12.

Holder barrel 50, residing within bore 13 of holder body 12, may be movable relative to holder body 12 between a first position and a second position, in which the holder head 52 extends from the holder body bore 13 a first distance if the holder barrel 50 is in the first position and the holder head 52 extends from the holder body bore 13 a second distance if the holder barrel 50 is in the second position, the first distance being greater than the second distance.

Additionally, one or more coned-disc springs may be included with electrode holder 10. Such a spring, for example a Belleville washer 36, is a frusto-conical shape washer, being annular and a defining a central channel. The cupped shape of the Belleville washer 36 provides a spring function to the device against longitudinal force. Belleville washer 36 may be of a particular thickness, and different Belleville washers 36 of differing thicknesses may be selected for particular usages of electrode holder 10. The material by which Belleville washer 36 is fabricated has a suitable modulus of elasticity to provide resilience.

Belleville washer 36 may reside within holder body cavity 13. Being annular and defining a central channel, Belleville washer 36 may reside within cavity 13 and opposite the holder slider 53 from the holder head 52. Holder axle 51 may be disposed through the central channel of Belleville washer 36. Belleville washer 36 may bias the holder barrel 50 toward the first position of holder barrel 50, Belleville washer 36 being compressed by movement of holder barrel 50 from its first position to its second position.

Multiple Belleville washers 36 may be stacked together to modify the spring constant and/or the amount of deflection allowed by the assemblage of Belleville washers 36. Stacking 2 or more Belleville washers 36 in the same direction is referred to as stacking "in parallel," and will add the spring constant of the assemblage, creating a stiffer assemblage with the same amount of deflection. Stacking multiple Belleville washers 36 in an alternating directions is referred to as stacking "in series," resulting in a lower spring constant and greater deflection of the assemblage upon compression. Mixing and matching of two or more Belleville washers 36 allow a specific spring constant and a specific deflection capacity to be designed. Moreover, differing thicknesses of multiple Belleville washers 36, providing differing spring constants to each, may be interchanged, and may be configured to provide a high degree of ability to tune the spring rate of the assemblage, for particular applications of electrode holder 10.

Different electrode compressive forces from electrode holder 10 may be required for different welding applications. Such differing electrode compressive forces may be achieved by replacing, subtracting from, or supplementing the number of Belleville washers 36 used in a particular electrode holder 10. Such changes may be accomplished by removing clamp 63, removing barrel holder 50 from holder body 12, removing a first Belleville washer 36, and replacing the first Belleville washer 36 with a second Belleville washer 36 or supplementing a Belleville washer 36 with a second Belleville washer 36 of a different thickness, either in series or in parallel.

Additional components may be included in particular embodiments of electrode holder 10. For example, a top split contact 30 may be included. Top split contact 30 is a multi-element, electrically conductive washer-like element comprising sections 30*a-c*. Top split contact 30 may have a planar lower surface and a frusto-conical upper surface, the frusto-conical upper surface complementary to the negative frusto-conical concavity upper terminus 14. Similarly, an electrically conductive bottom split contact 31 may be provided. Bottom split contact 31 likewise is a multielement, washer-like element comprising sections 31*a-c*. Bottom split contact 31 may have a planar upper surface and a negative frusto-conical concave lower surface, the negative frusto-conical concave lower surface complementary to the frusto-conical shape of upper shoulder 54 of holder slider 53. Positioning top split contact 30 to abut upper terminus 13 will urge top split contact sections 30*a-c* to move radially inwardly against holder axle 51 as holder barrel 50 is moved upward relative to holder body 12, thereby increasing the surface area of electrical contact for current flowing from holder body 12 through top split contact sections 30*a-c* to holder axle 51. Likewise, positioning bottom split contact 31 to abut the frusto-conical shape of upper shoulder 54 of holder slider 53 will urge bottom split contact sections 31*a-c* to move radially outwardly against the surface of holder body bore 13 as holder barrel 50 is moved upward relative to holder body 12, thereby increasing the surface area of electrical contact for current flowing from holder body 12 through bottom split contact sections 31*a-c* to holder slider 53.

One or more shims 32, such as shims 32*a*, 32*b*, may also be included, in some embodiments to reside around holder axle 51. Shims 32 may be used to reserve space for adjustment of electrode holder 10, allowing for removal of one of more shim 32 and addition of one or more Belleville washers 36 if a particular application requires the addition of more Belleville washers 36. Shims 32 may reside at any advantageous location above holder slider 53. For example, a shim 32 may be installed in place of, and in the same location as, a Belleville washer 36 that it is replacing, as described below. Conversely, a shim 32 may be removed to create space for installation of an additional Belleville washer 32, as described below.

In particular embodiments, a shim 32 may include a shim recess 86, in which recess 86 may reside a wavy washer 33. Wavy washer 33 may be used to reduce or eliminate rattle of the assembled components of an electrode holder 10.

In selective embodiments of electrode holder 10, an upper cup 34 and/or a lower cup 35 may be provided. Upper cup 34 may reside within bore 13 distal to holder head 52, and disposed to open downwardly, to receive therein one or more Belleville washers 36. Similarly, lower cup 35 may reside more proximate to holder head 52 and disposed to open upwardly, to receive one or more Belleville washers 36. Provision of upper cup 34 and/or lower cup 35 may allow for movement of holder barrel 50 within holder body 12, without friction between the outer perimeters of Belleville washers 36 against holder body bore 13.

Holder head 52 may include one or more coolant channels, for example coolant channels 62*a*-*c*. Coolant channels 62*a*-*c* may be provided with coolant by fitting a first coolant hose barb 56 to a first coolant hose barb aperture 57, and/or fitting a second coolant hose barb 58 to a second coolant hose barb aperture 59, and allowing coolant within coolant channels 62*a*-*c*. Additionally an electrode used with electrode holder 10 may likewise be cooled, by providing an electrode liquid cooling tube 60 interfitted into holder head 52 at electrode coolant tube aperture 61.

Configured with varying combinations of the foregoing components, electrode holder 10 requires no flowing coolant provided within holder body 12. So configured, holder body bore 13, carrying holder barrel 50 and one or more Belleville washers 36 along with a top split contact 30 and/or a bottom split contact 31, may be free of flowing coolant. In particular embodiments, holder body 12 may be closed to the receipt of flowing coolant and thereby devoid of such coolant.

The electrode holder 10 aforedescribed provides a method of projection welding that may comprise the following steps. An electrode may be attached to holder head 52, the electrode may be contacted against a projection from the welding work. Increasing compressive force between the electrode and the projection may be applied from the welding machine until holder barrel 50 moves toward its second position. Doing so will compress the one or more Belleville washers 36 within electrode holder 10 and electric current may then be provided through the electrode, heating the welding work until the projection collapses. Force would then be maintained from the electrode to the welding work during such projection collapse by holder barrel 50 moving toward its first position resulting from the decompression of the first Belleville washer 36. With the welding completed, the electrode may be removed from the welding work.

The electrode holder 10 aforedescribed also provides a method of increasing the welding force of electrode holder 10, comprising the following steps. First, clamp 63 may be removed from holder body 12. Holder barrel 50 may then be removed from holder body 12. A second Belleville washer 36 may be added in parallel with a first Belleville washer 36. If necessary to create space for the second Belleville washer 36, one or more shim 32 may be removed. Holder barrel 50 may then be replaced within holder body 12 and clamp 63 reattached to holder body 12. By means of the foregoing steps, the welding force of electrode holder 10 may thereby be increased.

The electrode holder 10 aforedescribed also provides a method of increasing the length of the extension stroke of the electrode holder 10, by the following steps. Clamp 63 may be removed from holder body 12, and holder barrel 50 may then be removed from holder body 12. A second Belleville washer 36 may be added in series with a first Belleville washer 36. If necessary to create space for the second Belleville washer 36, one or more shim 32 may be removed. Holder barrel 50 may then be returned within bore 13 of holder body 12, and clamp 63 reattached to holder body 12. By way of the foregoing steps, the length of the extensions stroke of the electrode holder 10 may be increased.

The appended drawings illustrate embodiments of electrode holder 10 of the present invention. FIG. 1 shows various elements, such as shank 80, holder body 12, and holder head 52 extending from holder body 12. A clamp 63 has been fitted to lower first end 84 of holder body 12. First and second coolant hose barbs 56, 58 have been fitted into holder head 52. Likewise, electrode liquid cooling tube 60 has been fitted into holder head 52. Upper end 85 and lower first end 84 are labeled, for orientation.

Figure 2:
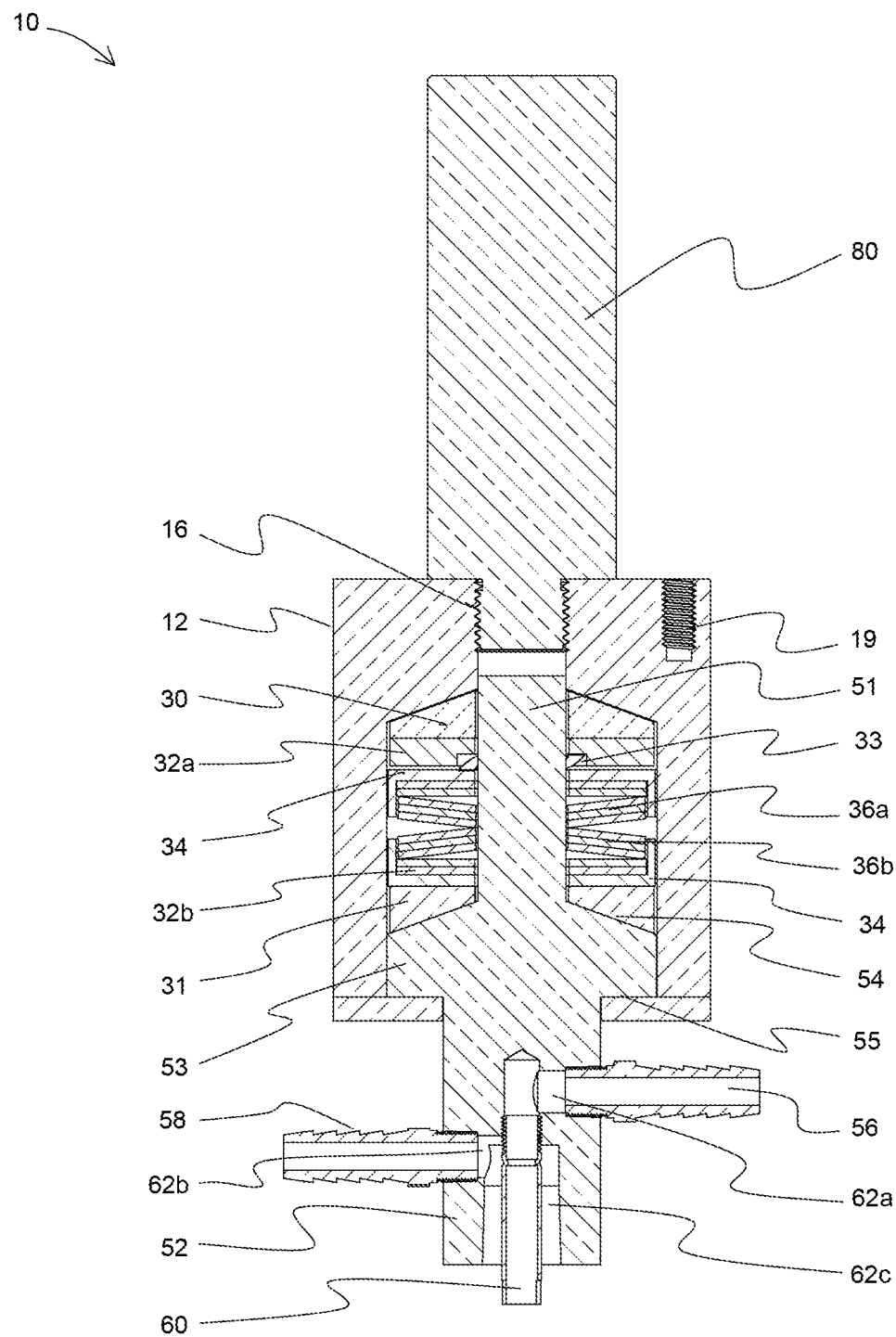
FIG. 2 is a cross-sectional view, taken at A:A in FIG. 1, of a projection welding electrode holder in accordance with an embodiment of the present invention.

FIG. 2 represents an illustration of an embodiment of electrode holder 10 with holder head 52 in a first, more extended position, relative to holder body 12. As illustrated therein, Bellville washers 36*a*, 36*b* have been stacked in series, and are uncompressed. Upper cup 34 is illustrated in cross-section as retaining within upper cup 34 upper Bellville washer 36*a*. Lower cup 35 is likewise shown illustrating its orientation, including within its cup Bellville washer 36*b*. Threaded end 81 of shank 80 has been interfitted into holder body 12. The position of holder head 52 as illustrated in FIG. 2 may be that of holder 10 not in use or alternatively may be that of electrode holder 10 after a projection of a projection weld has collapsed.

Figure 3:
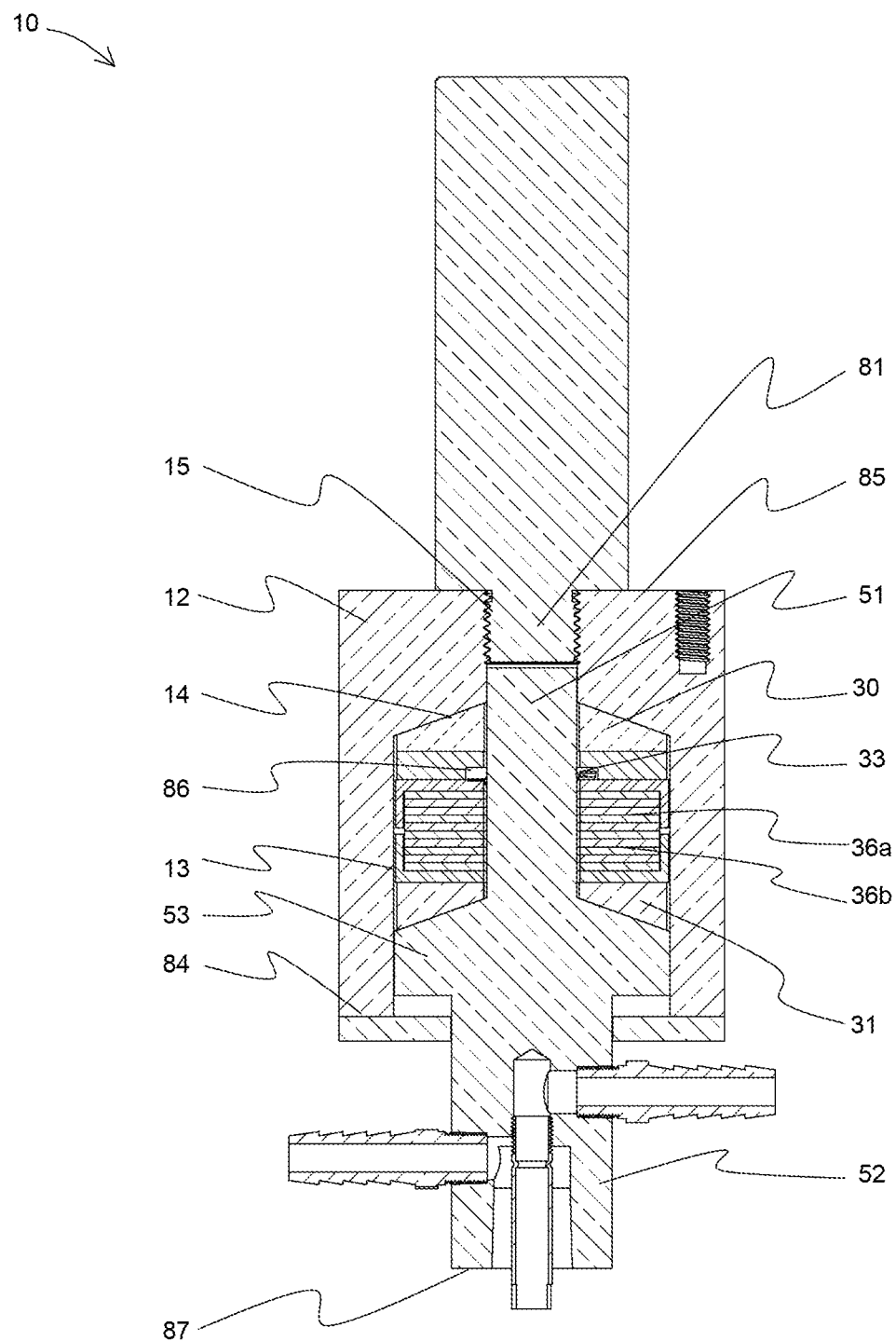
FIG. 3 is a cross-sectional view, taken at A:A in FIG. 1, of a projection welding electrode holder in accordance with an embodiment of the present invention.

FIG. 3 shows a cross-section of electrode holder 10 as it has been forced on a welding work with the projection not having collapsed. The force urging electrode holder 10 against the welding work has moved holder barrel 50 to its second position, compressing Bellville washers 36*a*, 36*b*. The compression of Bellville washers 36*a*, 36*b* has urged the sections 30*a*-*c* of top split contact 30 against the slope of upper terminus 14, urging top split contact sections 30*a*-*c* radially inward against holder axle 51. Similarly, the compression of Bellville washers 36*a*, 36*b* has urged the sections 31*a*-*c* of bottom split contact 31 against the sloped upper shoulder 54 of holder slider 53, urging bottom split contact sections 31*a*-*c* radially outward against the holder body bore 13. Electrical current applied, for example, to shank 80 would thereby travel into holder body 12, through top split contact 30, and from top split contact 30 to holder axle 51. Moreover, electrical current would travel from holder body 12 through bottom split contact section 31*a*-*c* into holder slider 53. Both such pathways would thereby convey such electrical current to the electrode mounted on lower end 87 of holder head 52.

Figure 4:
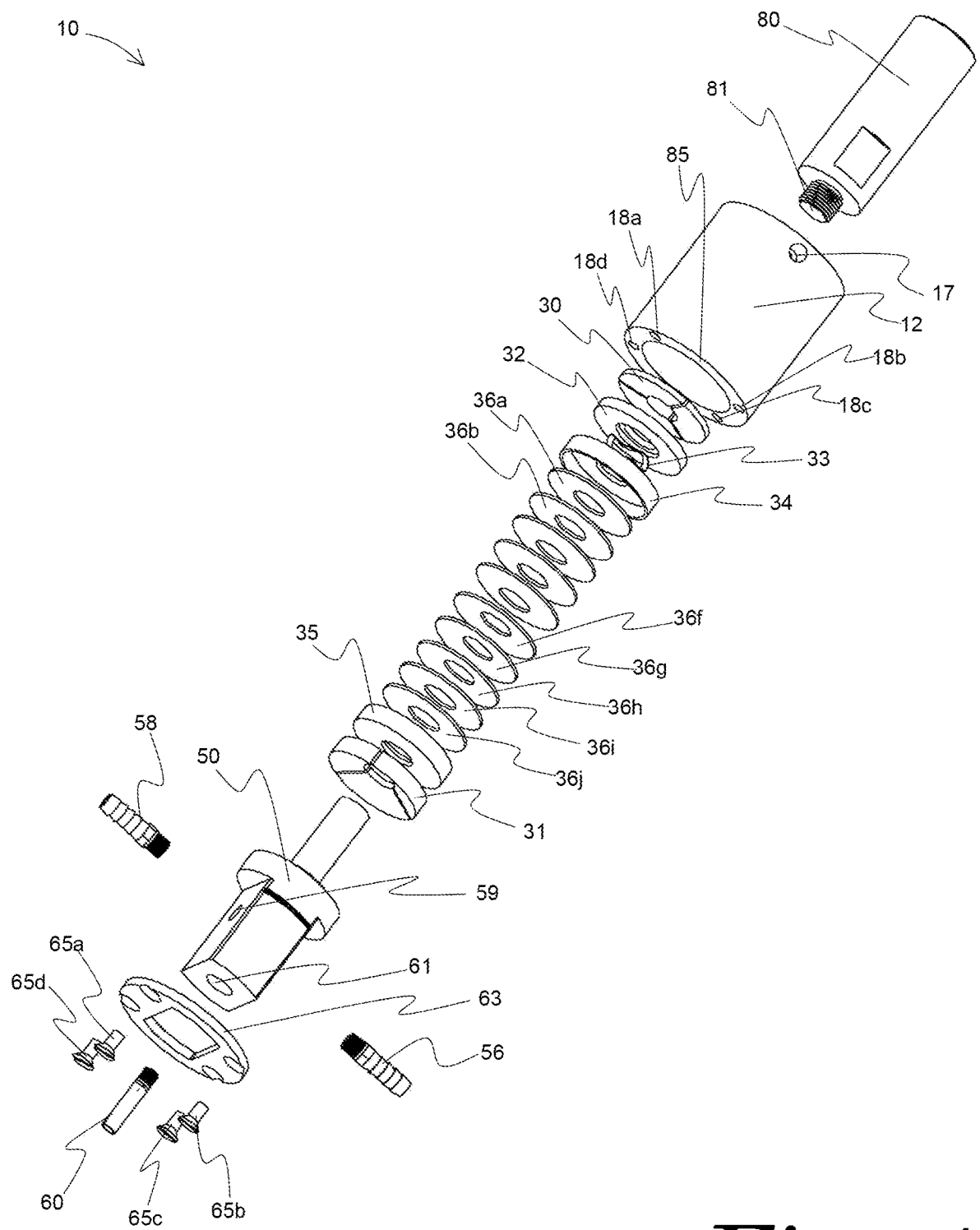
FIG. 4 is exploded view of a projection welding electrode holder in accordance with an embodiment of the present invention.

FIG. 4 presents an exploded view of an embodiment of electrode holder 10, showing the relative exemplary positioning of the components aforedescribed.

Figure 5:
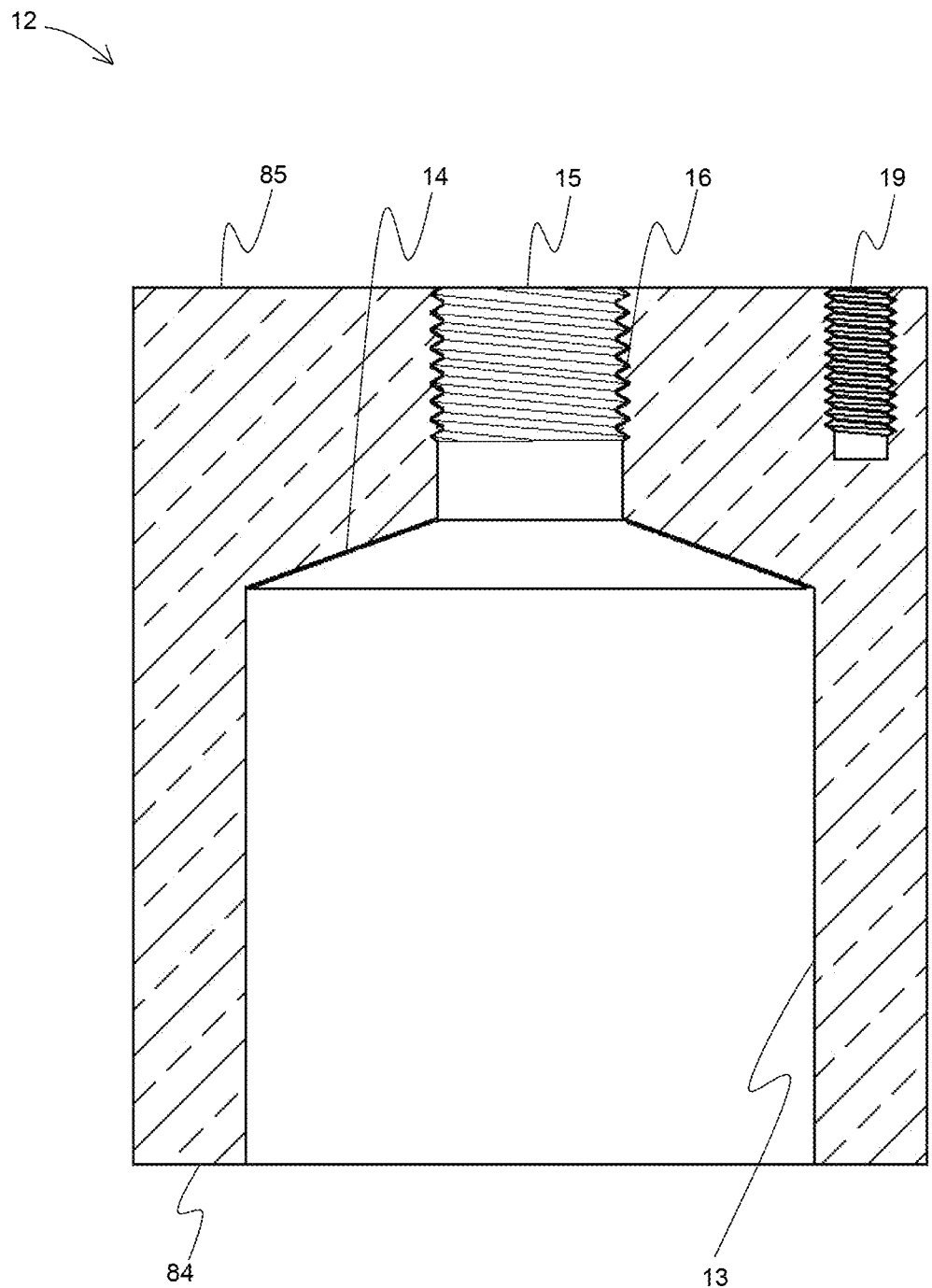
FIG. 5 is a cross-sectional view, taken at A:A in FIG. 1, of a projection welding electrode holder holder body in accordance with an embodiment of the present invention.

FIG. 5 illustrates a cross-sectional view of a holder body 12. As illustrated, holder body 12 includes an upper second end 85, a lower first end 84, and a holder body bore 13. Holder body bore upper terminus 14 is illustrated to show its negative frusto-conical concavity. Shank bore 15 is also illustrated, including shank bore threads 16 for possible receipt of a shank 80 with a threaded end 81. A tapped hole 19 has optionally also been provided for possible attachment of holder body 12 to a welding machine other than by a shank 80.

Figure 6:
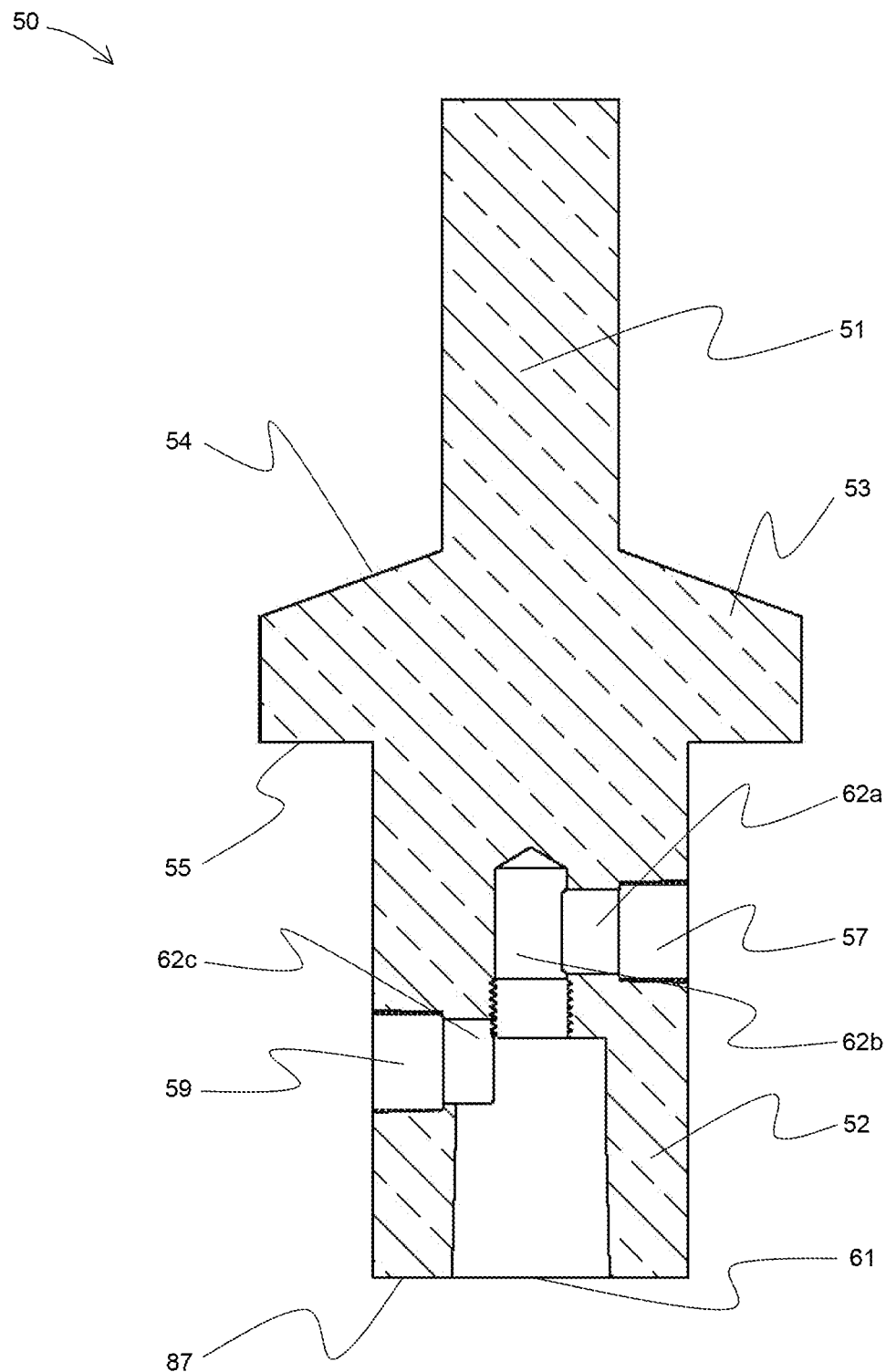
FIG. 6 is a cross-sectional view, taken at A:A in FIG. 1, of a projection welding electrode holder holder barrel in accordance with an embodiment of the present invention.

FIG. 6 illustrates an embodiment of a holder barrel 50, including a holder axle 51, holder head 52 with lower end 87, and holder slider 53. Hose barb apertures 57, 59 are also illustrated as is electrode liquid cooling tube aperture 61. Similarly, coolant channels 62*a*-*c* are illustrated. Notably, coolant channels 62*a*-*c* do not extend in holder barrel 50.

Figure 7:
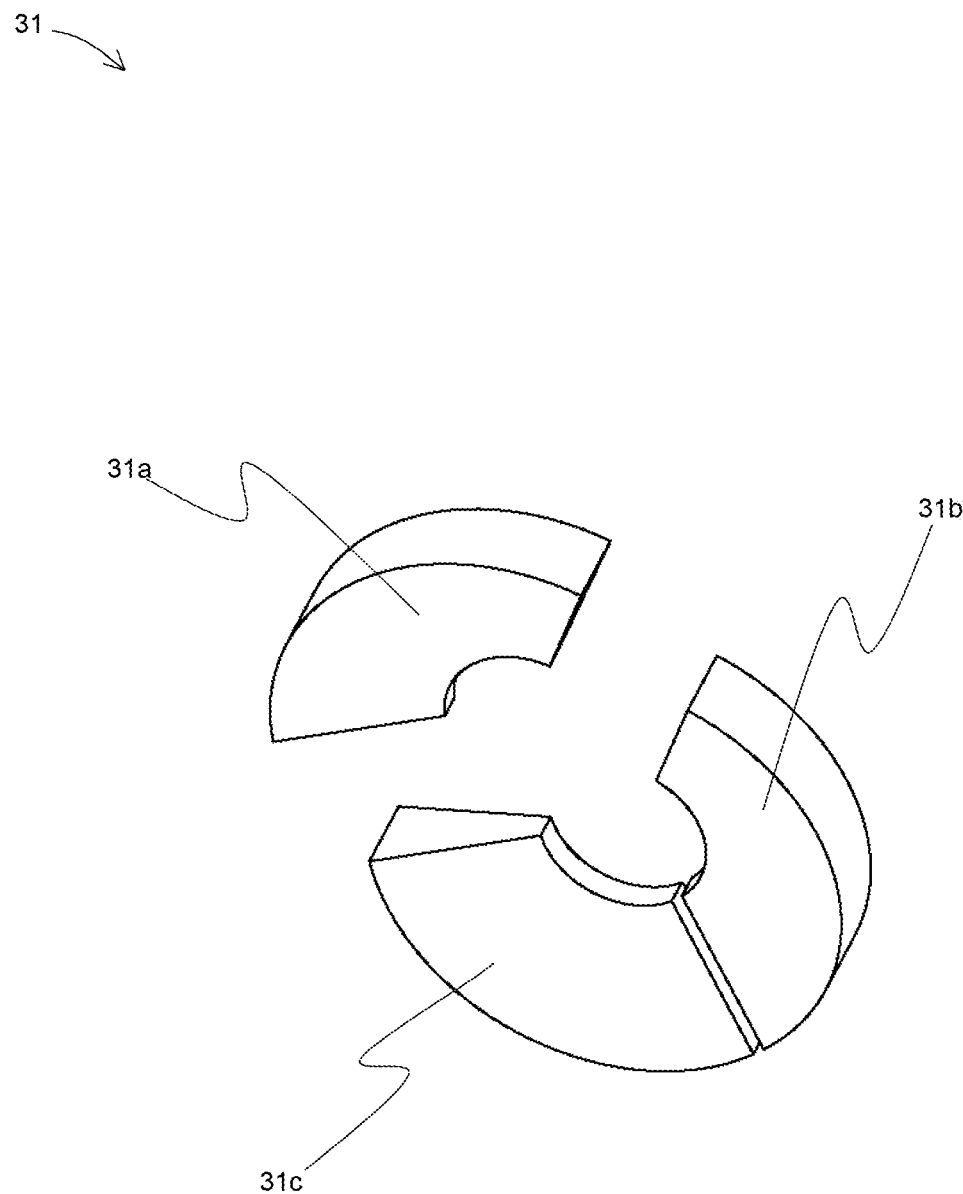
FIG. 7 is an exploded view of a projection welding electrode holder bottom split contact in accordance with an embodiment of the present invention.

Finally, FIG. 7 illustrates an exploded view of a bottom split contact 31, showing bottom split contact sections 31*a*-*c*. As illustrated, bottom split contact 31 has a negative frusto-conical concave lower surface.

So configured, electrode holder 10 provides a projection welding electrode holder that is adjustable, both as to the force of the holder barrel against the welding work as well as the length of the extension stroke of holder 10. The relatively low mass of the moving parts of electrode holder 10, comprising the holder barrel 50, also provides for instantaneous extension of holder head 52 during collapse of the projection during a projections welding operation. Such a configuration assures instantaneous response to plasticity changes in the welding work, while maintaining constant pressure, to prevent "blowout" or other welding defects that might result otherwise if the interface resistance were raised by reduction of pressure. Due to the nature of the coned-disc springs, a high compressive force may be obtained within a relatively short compression stroke. Different compression forces may be achieved by interchanging the Bellville washers of electrode holder 10. The size of electrode holder 10, resulting from use of the aforedescribed components, is very compact. Additionally, electrode holder 10 may be retrofitted to existing machines, such press welders, rock or arm welders and multisport welders.

The interior of holder body 12 of electrode holder 10 is dry, which avoids risk of corrosion to the Belleville springs 36, reduces the possibility of O-ring failure, and eliminates the risk of leakage.

With fewer moving components, electrode holder 10 also provides less frictional resistance to the movement of holder barrel 50.

Electrode holder 10, with components made of copper, minimizes the resistance in the welding secondary circuit. The design of electrode holder 10 may be electrically isolated from the actuator. Doing so reduces the electrical resistance during the welding operation, thereby reducing the absorption of electrical energy during the operation.

To be observed also is that the electrode holder 10, configured as aforedescribed, allows for the use of electrode holder 10 with any means of actuation, including pneumatic, hydraulic, and electromechanical.

Furthermore, the longitudinal force transmission resulting from use of the Belleville washers, because they are annular, maintains perpendicularity of the components of electrode holder 10, providing for more precise welding operations.

Additionally, the design of electrode holder 10 as described herein is adaptable to today's market demands for higher welding currents and higher welding compression forces.

In total, the design of electrode holder 10 provides excellent operability in use.

Detailed embodiments of the present invention are disclosed herein; however, while various embodiments and examples of this invention have been described above, these descriptions are given for purposes of illustration and explanation, and not limitation. Variations, changes, modifications, and departures from the systems and methods disclosed above may be adopted without departure from the spirit and scope of this invention. Moreover, specific structural and functional details disclosed herein are not to be interpreted as limiting, but merely as a basis for the claims and as a representative basis for teaching one skilled in the art to variously employ the present invention. It will be apparent to those skilled in the art that many changes and substitutions may be made to the foregoing description of preferred embodiments and examples without departing from the spirit and scope of the present invention, which is defined by the appended claims.

Further, the purpose of the Abstract is to enable the various patent offices and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

The invention claimed is:

1. A projection welding electrode holder, comprising:
   a holder body, the holder body configured for attachment to a welding machine, the holder body defining therein a holder body bore;
   a holder barrel, the holder barrel being carried within the holder body bore, the holder barrel including a slider and a holder head, the holder head extending from the holder body bore and configured for attachment to a welding electrode;
   the holder barrel being movable relative to the holder body between a first position and a second position, in which the holder head extends from the holder body bore a first distance if the holder barrel is in the first position and the holder head extends from the holder body bore a second distance if the holder barrel is in the second position, the first distance being greater than the second distance; and
   a first coned-disc spring, the first coned-disc spring residing within the holder body bore and opposite the slider from the holder head, the first coned-disc spring biasing the holder barrel toward the first position, the first coned-disc spring being compressed by movement of the holder barrel from the first position to the second position.

2. The projection welding electrode holder of claim 1, in which the holder barrel is integral.

3. The projection welding electrode holder of claim 1, in which the holder body and the holder barrel are electrically conductive.

4. The projection welding electrode holder of claim 1, in which the holder body is closed to the receipt of flowing coolant.

5. The projection welding electrode holder of claim 1, further including a second coned-disc spring, the first and second coned-disc springs being stacked in parallel.

6. The projection welding electrode holder of claim 1, further including a second coned-disc spring, the first and second coned-disc springs being stacked in series.

7. A projection welding electrode holder, comprising:
   a holder body, the holder body configured for attachment to a welding machine, the holder body having an opening at one end and defining an internal cavity within the opening, the cavity being free of flowing coolant;
   a holder barrel, the holder barrel having a holder head configured to carry a welding electrode, a holder axle extending opposite the holder head, and a holder slider disposed between the holder head and the holder axle, the holder axle and the holder slider residing within the internal cavity and the holder head extending from the holder body;
   the holder head, the holder axle, and the holder slider being integral and electrically conductive;
   the holder barrel being movable relative to the holder body and relative to the welding machine between a first position and a second position, in which the holder head extends from the holder body a first distance when the holder barrel is in the first position and the holder head extends from the holder body a second distance when the holder barrel is in the second position, the first distance being greater than the second distance; and
   a first Belleville washer, the first Belleville washer being annular and defining a central channel, the first Belleville washer residing within the cavity and opposite the slider from the holder head with the holder axle disposed within the central channel, the first Belleville washer biasing the holder barrel toward the first position, the first Belleville washer being compressed by movement of the holder barrel from the first position to the second position.

8. The projection welding electrode holder of claim 7, further including a removable cover over the opening, the cover defining therethrough an aperture through which the holder head is disposed.

9. The projection welding electrode holder of claim 7, in which the first Belleville washer is replaceable by removing the holder barrel from the holder body, removing the first Belleville washer, and replacing the first Belleville washer with a second Belleville washer.

10. The projection welding electrode holder of claim 7, further including a second Belleville washer, the first and second Belleville washer being stacked in one of parallel and series.

11. The projection welding electrode holder of claim 7, further including a first split contact, the first split contact being electrically conductive and residing between the holder slider and the first Belleville washer.

12. The projection welding electrode holder of claim 11, further including a second split contact, the first split contact being electrically conductive and residing opposite the first Belleville washer from the holder slider.

13. A method of projection welding, comprising the steps of:
providing the projection welding electrode holder of claim 7;
attaching an electrode to the holder head;
providing a welding work that includes a projection;
contacting the electrode against the welding work at the projection and increasing compressive force between the electrode and the projection until the holder barrel moves toward the second position;
applying electric current through the electrode until the projection collapses; and
maintaining force from the electrode to the welding work during such projection collapse by the holder barrel moving toward the first position resulting from at least partial decompression of the first Belleville washer.

14. A projection welding electrode holder, comprising:
a holder body, the holder body:
configured for static attachment to a welding machine;
being electrically conductive;
having a first end and an opposed second end; and
defining a cylindrical cavity therein with a first diameter, the cavity open at the first end of the holder body and walled at the second end and devoid of flowing coolant;
a holder body cover, the cover removably attached to the first end of the holder body and having an opening therethrough;
a holder barrel, the holder barrel having a holder head configured to carry a welding electrode, a holder axle extending opposite the holder head, and a holder slider disposed between the holder head and the holder axle, the holder axle and the holder slider residing within the internal cavity and the holder head extending from the holder body through the opening of the cover, the holder slider having a second diameter sized to complement the first diameter;
the holder head, the holder axle, and the holder slider being integral and electrically conductive;
the holder barrel being movable relative to the holder body and relative to the welding machine between a first position and an opposite second position, in which the holder head extends from the holder body a first distance when the holder barrel is at the first position and the holder head extends from the holder body a second distance when the holder barrel is at the second position, the first distance being greater than the second distance;
the holder head including a coolant channel, the coolant channel isolated from the holder body cavity; and
a first Belleville washer, the first Belleville washer being an annular open ring, the first Belleville washer residing within the cavity and opposite the slider from the holder head with the holder axle disposed within the open ring, the first Belleville washer biasing the holder barrel toward the first position, the first Belleville washer being compressed by movement of the holder barrel from the first position to the second position.

15. The projection welding electrode holder of claim 14, the holder body and the holder barrel being fabricated of copper.

16. The projection welding electrode holder of claim 14, the holder being configured for static attachment to any one of a press welder, a rocker arm welder, and a multi-spot welder.

17. The projection welding electrode holder of claim 14, the holder being configured for use with a welder of any one of pneumatic, hydraulic, and electromechanical actuation welders.

18. The projection welding electrode holder of claim 14, in which the first Belleville washer is replaceable by removing the cover, removing the holder barrel from the holder body, removing the first Belleville washer, and replacing the first Belleville washer with a second Belleville washer.

19. A method of increasing the welding force of a projection welding electrode holder, comprising the steps of:
providing the projection welding electrode holder of claim 14;
removing the cover;
removing the holder barrel from the holder body;
adding a second Belleville washer in parallel with the first Belleville washer;
replacing the holder barrel in the holder body; and
reattaching the cover.

20. A method of increasing the length of the extension stroke of a projection welding electrode holder, comprising the steps of:
providing the projection welding electrode holder of claim 14;
removing the cover;
removing the holder barrel from the holder body;
adding a second Belleville washer in series with the first Belleville washer;
replacing the holder barrel in the holder body; and
reattaching the cover.

* * * * *